United States Patent
Tuttle, Jr. et al.

(10) Patent No.: US 9,462,086 B2
(45) Date of Patent: Oct. 4, 2016

(54) SHORT MESSAGE SERVICE (SMS) OVER SGS

(71) Applicant: TeleCommunication Systems, Inc., Annapolis, MD (US)

(72) Inventors: Lewis Tuttle, Jr., Stevensville, MD (US); Ricardo Andresol, McLean, VA (US)

(73) Assignee: Telecommunication Systems, Inc., Annapolis, MD (US)

(*) Notice: Subject to any disclaimer, the term of this patent is extended or adjusted under 35 U.S.C. 154(b) by 38 days.

(21) Appl. No.: 14/229,298

(22) Filed: Mar. 28, 2014

(65) Prior Publication Data

US 2014/0355586 A1    Dec. 4, 2014

Related U.S. Application Data

(60) Provisional application No. 61/806,111, filed on Mar. 28, 2013.

(51) Int. Cl.
| | |
|---|---|
| H04W 4/00 | (2009.01) |
| H04L 29/06 | (2006.01) |
| H04W 4/14 | (2009.01) |
| H04W 88/16 | (2009.01) |
| H04W 88/18 | (2009.01) |
| H04L 12/66 | (2006.01) |

(52) U.S. Cl.
CPC ............. H04L 69/08 (2013.01); H04W 4/14 (2013.01); H04L 12/66 (2013.01); H04W 88/16 (2013.01); H04W 88/184 (2013.01)

(58) Field of Classification Search
CPC ........................................................ H04L 12/66
USPC ................................. 370/352–467; 455/466
See application file for complete search history.

(56) References Cited

U.S. PATENT DOCUMENTS

| | | | |
|---|---|---|---|
| 6,920,144 B2 * | 7/2005 | Niermann | H04M 7/0009 370/401 |
| 7,899,475 B2 | 3/2011 | Veeraraghaven et al. | |
| 2011/0021216 A1 * | 1/2011 | Pudney | H04W 4/12 455/466 |
| 2012/0184262 A1 * | 7/2012 | Olsson | H04W 8/02 455/422.1 |

* cited by examiner

*Primary Examiner* — Iqbal Zaidi
(74) *Attorney, Agent, or Firm* — Tarolli, Sundheim, Covell & Tummino LLP

(57) ABSTRACT

A short message service (SMS) over SGs solution comprising an SGs application part (SGsAP) gateway. The SGsAP gateway is positioned between a mobile management entity (MME) on a long term evolution (LTE) network and a short message service center (SMSC)/home location register (HLR) on a circuit-switched (CS) network to permit SMS messages to be passed between the two domains. The SGsAP gateway performs centralized routing to home public land mobile networks (HPLMN) on the circuit-switched (CS) domain. An SGs interface is used to route messages between an SGsAP gateway and a mobile management entity (MME) on a long term evolution (LTE) network. The inventive solution does not require CS networks to support an SGs interface. In accordance with the principles of the present invention, a mobile management entity (MME) need only maintain a single SCTP association to a SGsAP gateway.

11 Claims, 12 Drawing Sheets

SHORT MESSAGE SERVICE (SMS) OVER SGs

The present invention claims priority from U.S. Provisional No. 61/806,111, filed Mar. 28, 2013, entitled "SMS over SGs", the entirety of which is expressly incorporated herein by reference.

BACKGROUND OF THE INVENTION

1. Field of the Invention

This invention relates generally to implementation of a short messaging service (SMS) over an SGs interface.

2. Background of Related Art

Long Term Evolution (LTE) 4G wireless broadband technology is an all-Internet Protocol (IP) based technology that supports packet based services only (i.e., it supports services solely over the Internet).

While a majority of commercial service providers can be expected to adopt an all-Internet Protocol (IP) based technology (e.g. long term evolution) at some time in the near future, a great deal of today's mobile services are still circuit-switched (CS) (i.e. supported by a legacy circuit-switched (CS) network). To enable user equipment (UE) serviced by a Long Term Evolution (LTE) technology (i.e. all Internet Protocol (IP) based technology) to provide circuit-switched (CS) services (voice, SMS, location, etc.), the mobile user equipment (UE) falls back to the circuit-switched (CS) domain.

FIG. 8 depicts a conventional architecture interfacing an IP-based Long Term Evolution (LTE) network with a circuit-switched (CS) 3G network. In such architecture, there is no CS fallback for SMS services over the SGs link.

As portrayed in FIG. 8, an SGs interface 114 interconnects a mobile management entity (MME) 116 on a Long Term Evolution (LTE) network (e.g., Evolved Packet Core (EPC) network) 104 with a gateway-mobile switching center (MSC) server 900 on a circuit-switched (CS) network (e.g., 2G/3G core network) 100 to permit messaging between the two entities.

But to provide SMS services to the UE 102, the 3G core network 100 must be updated to support the new SGs interface. To do so, the MME 116 must perform complex HPLMN routing to the CS domain, and the MME 116 must manage SCTP associations to every MSC server 120 within the 3G network 100.

FIG. 9 depicts a conventional roaming architecture for providing short message service (SMS) over an SGs interface, causing circuit-switched (CS) fallback messaging 106.

In particular, a mobile device 102 can only fallback to 3G in the case where evolved UMTS terrestrial radio access network (E-UTRAN) coverage (e.g., LTE) 108, is overlapped by either a GSM EDGE Radio Access Network (GERAN) 110 or a 3G Universal Terrestrial Radio Access Network (UTRAN) 112.

The mobile management entity (MME) 116 in the Long Term Evolution (LTE) network 104 is interconnected with each MSC Server 120 in the circuit-switched (CS) network (e.g. 3G core network) 100 via an SGs interface 114, to enable SMS messages to be routed between the two domains.

When the mobile switching center (MSC) server 120 on the circuit-switched (CS) network (i.e. 3G core network) 100 receives an SMS message addressed to the user equipment (UE) 102 serviced by a Long Term Evolution (LTE) network 104, the mobile switching center (MSC) server 120 forwards the SMS message over the SGs interface 114 to a mobile management entity (MME) 116 on the Long Term Evolution (LTE) network 104. The mobile management entity (MME) 116 then forwards the SMS message to the intended user equipment (UE) 102.

Similarly, when the user equipment (UE) 102 serviced by the Long Term Evolution (LTE) network 104 initiates an SMS message, the originating user equipment (UE) 102 passes the SMS message to a serving mobile management entity (MME) 116 on the Long Term Evolution (LTE) network 104, which subsequently forwards the SMS message over the SGs interface 114 to the mobile switching center (MSC) server 120 on the circuit-switched (CS) network 100. The SMS message is then routed to an intended message recipient.

FIG. 10 depicts a conventional SGs interface protocol stack.

As depicted in FIG. 10, an SGs application part (AP) protocol 800 over a Stream Control Transmission Protocol (SCTP) 810 is used to route messages over a conventional SGs interface 114.

The present inventors have recognized, and appreciated, that fallback signaling to 3G can cause considerable service delays.

SUMMARY OF THE INVENTION

A method and apparatus for enabling a user equipment (UE) serviced by a long term evolution (LTE) network (i.e. evolved packet core (EPC) network) to send and receive circuit-switched (CS) short message service (SMS) messages, absent a circuit-switched (CS) fallback, comprises an SGs application part (SGsAP) gateway.

In accordance with the principles of the present invention, an SGs application part (AP) gateway is positioned between a mobile management entity (MME) on a long term evolution (LTE) network and a short message service center (SMSC)/home location register (HLR) on a circuit-switched (CS) network to permit SMS messages to be passed between the two domains. The inventive SGs application part (AP) gateway performs appropriate protocol conversion to enable communication between the long term evolution (LTE) and circuit-switched (CS) domains.

In accordance with the principles of the present invention, a conventional SGs interface is only used to route messages between an SGs application part (AP) gateway and a mobile management entity (MME) on a long term evolution (LTE) network. The inventive solution does not require circuit-switched (CS) networks to be modified to support an SGs interface.

In the inventive SMS over SGs solution, comprising an SGs application part (AP) gateway, a mobile management entity (MME) maintains only a single stream control transmission protocol (SCTP) association, to the SGs application part (AP) gateway. This is advantageous over conventional SMS over SGs solutions, which require mobile management entities (MME) to maintain a stream control transmission protocol (SCTP) association to every mobile switching center (MSC) server on a circuit-switched (CS) network.

In accordance with the principles of the present invention, the inventive SGs application part (AP) gateway performs centralized routing to a circuit-switched (CS) home public land mobile network (HPLMN) to simplify signaling involved in SMS over SGs.

The inventive SGsAP gateway can simultaneously support roaming global system for mobile communications (GSM) and code division multiple access (CDMA) subscribers.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present inventors have appreciated that a drawback of the conventional SMS over SGs solution is that the solution requires legacy 2G/3G circuit-switched (CS) networks to support a new SGs interface. Moreover, the present inventors have appreciated that the conventional SMS over SGs solution requires mobile management entities (MME) on the long term evolution (LTE) network (i.e. evolved packet core (EPC) network) to perform complex home public land mobile network (HPLMN) routing to nodes on a circuit-switched (CS) network (e.g. a 2G/3G network). Further, the conventional SMS over SGs solution requires mobile management entities (MME) on the long term evolution (LTE) network to manage stream control transmission protocol (SCTP) associations to every mobile switching center (MSC) server on the circuit-switched (CS) network (i.e., the 3G core network)—which can become quite complex.

The present invention provides an SGs application part (SGsAP) gateway placed between the otherwise conventional circuit switched (CS) 3G core network, and an SGs interface from the LTE Evolved Packet Core (EPC) network. In this way, SMS services may be provided to user equipment (UE) without the need to trigger a circuit-switched (CS) fallback. The inventive short message service (SMS) over SGs gateway leverages existing 2G/3G infrastructure without requiring updates within the legacy 2G/3G infrastructure to support the new SGs interface.

In accordance with the principles of the present invention, an SGs application part (SGsAP) gateway provides a simple and efficient method for enabling short message service (SMS) over a conventional SGs interface.

Though the disclosed embodiments show and describe messaging by a "user equipment", the present invention relates equally to mobile machines (MM), a mobile machine being a mobile device that sends text messages for various purposes but does not have a user per se. Thus, the invention relates equally to mobile machines that, e.g., send a wake up notification to save battery use of a remote device, or that checks the device's location over the SGs interface. Also to mobile machines that can send status updates, data its collected, its location, etc.

Figure 1:
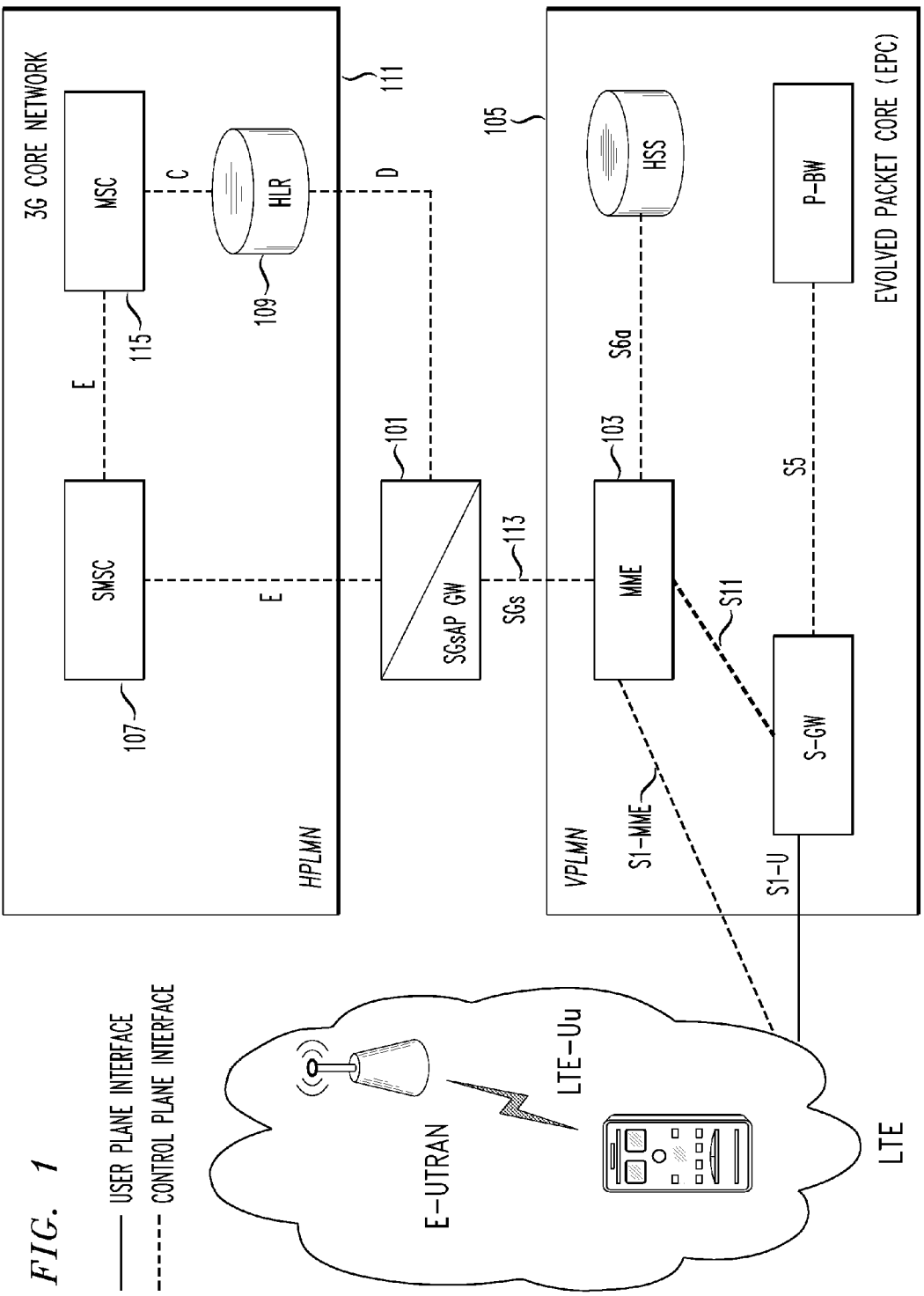
FIG. 1 depicts an exemplary architecture for providing short message service (SMS) over SGs via an SGs application part (SGsAP) gateway, in accordance with the principles of the present invention.

FIG. 1 depicts an exemplary architecture for providing short message service (SMS) over SGs via an SGs application part (SGsAP) gateway, in accordance with the principles of the present invention.

In particular, as depicted in FIG. 1, an SGs application part (SGsAP) gateway 101 is positioned between a mobile management entity (MME) 103 on a long term evolution (LTE) network (i.e. evolved packet core (EPC) network) 105 and a short message service center (SMSC) 107/home location register (HLR) 109 on a circuit-switched (CS) network (i.e. 3G core network) 111 to enable SMS messages to be passed between the two domains.

In accordance with the principles of the present invention, a conventional SGs interface 113 is only used to route messages between the inventive SGs application part (SGsAP) gateway 101 and mobile management entities (MME) 103 on the long term evolution (LTE) network 105. The inventive solution does not require circuit-switched (CS) networks 111 to be modified to support an SGs interface 113.

In addition, mobile management entities (MME) 103 on the long term evolution (LTE) network 105 need only maintain a single stream control transmission protocol (SCTP) association to the SGs application part (SGsAP) gateway 101. The inventive solution does not require mobile management entities (MME) 103 to maintain a stream control transmission protocol (SCTP) association to every mobile switching center (MSC) server 115 on a circuit-switched (CS) network (i.e. 3G core network) 111 (as is the case in the conventional SMS over SGs solution). The inventive solution thus simplifies duties of the mobile management entity (MME) 103 in providing SMS over SGs.

In accordance with the principles of the present invention, the inventive SGs application part (SGsAP) gateway 101 performs centralized routing to home public land mobile networks (HPLMN) on the circuit-switched (CS) domain 111. The inventive SGs application part (SGsAP) gateway 101 also provides local redundancy and geographical redundancy and generates call data records (CDR) for SMS communications.

Figure 2A:
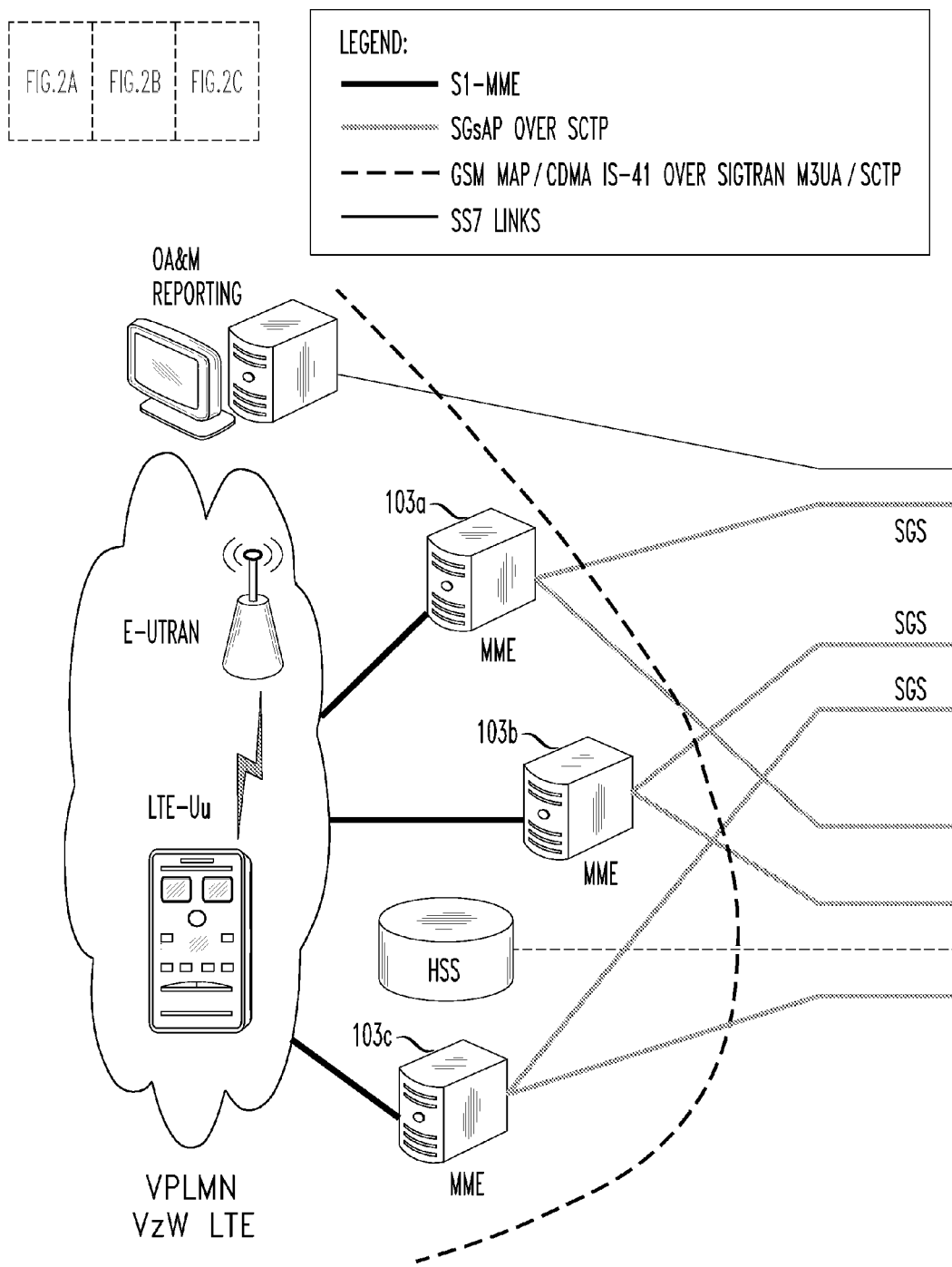
FIGS. 2A, 2B and 2C depict an exemplary network design for SMS over SGs roaming with an SGsAP gateway, in accordance with the principles of the present invention.
Figure 2B:
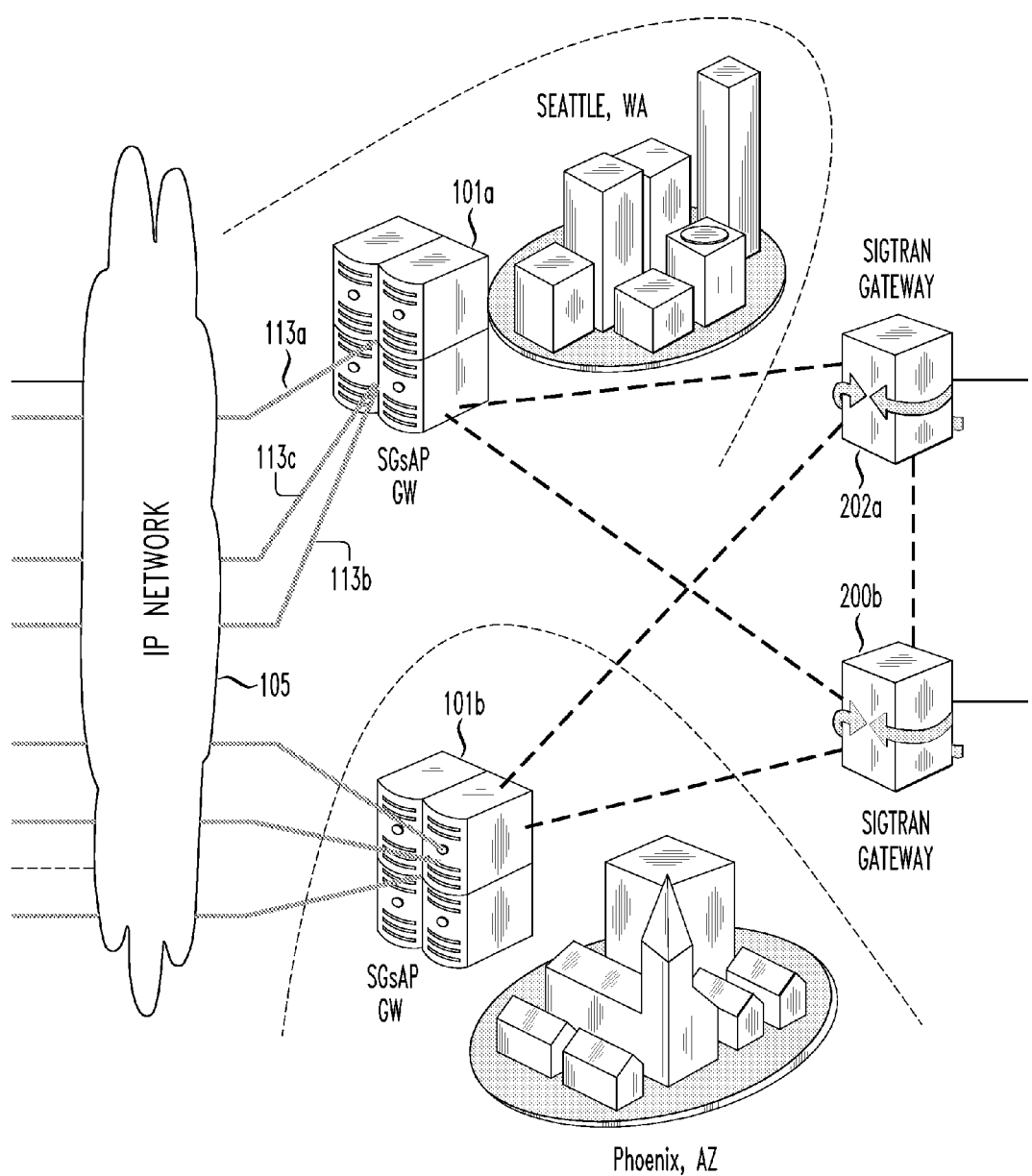
Figure 2C:
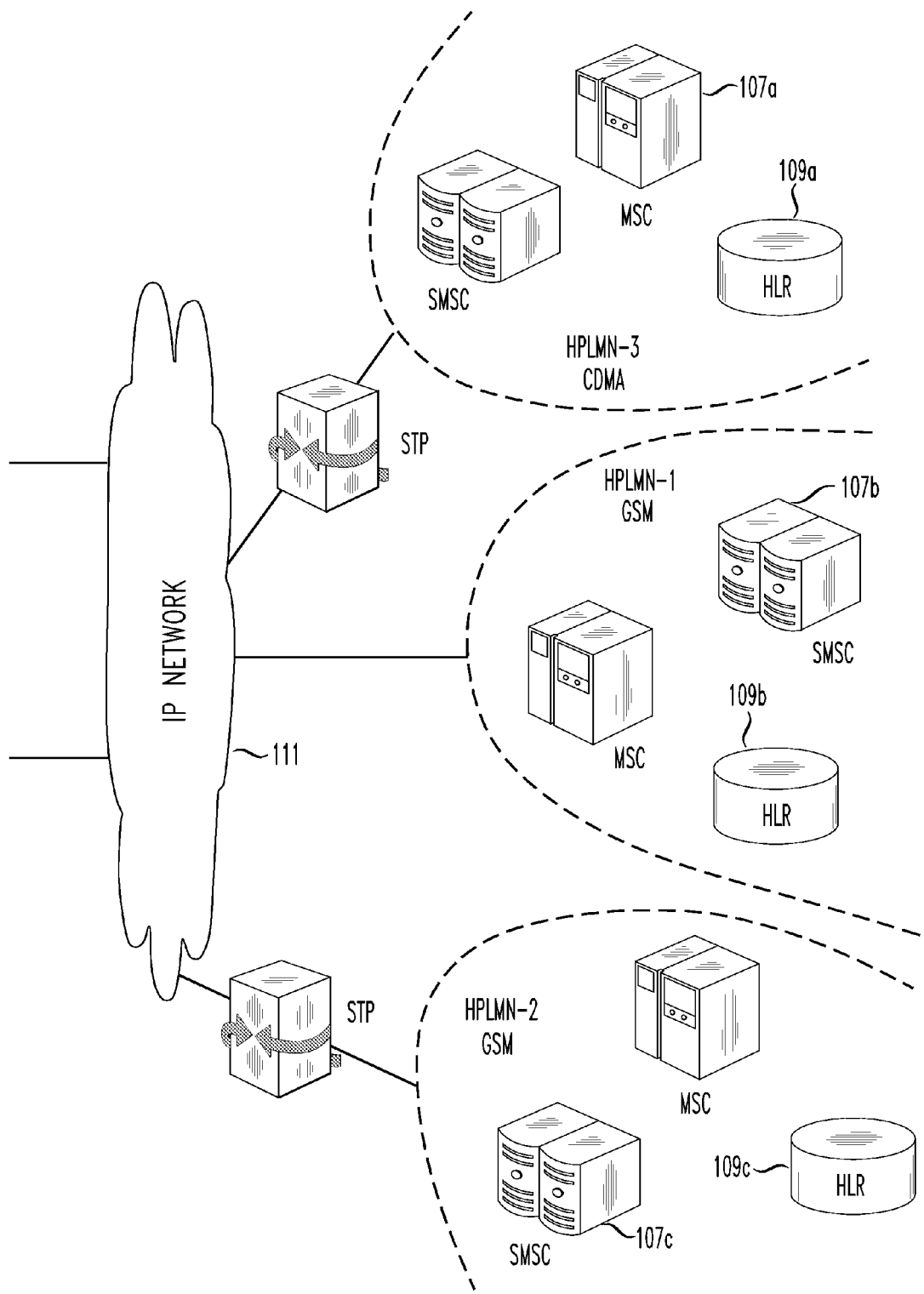

FIGS. 2A, 2B and 2C depict an exemplary network design for SMS over SGs roaming with an SGs application part (AP) gateway, in accordance with the principles of the present invention.

As depicted in FIGS. 2A, 2B and 2C messages transmitted between a circuit switched (CS) network 111 and an SGs application part (AP) gateway 101a, 101b traverse a signaling transport (SIGTRAN) gateway 200a, 200b. A signaling transport (SIGTRAN) gateway 200a, 200b enables signaling system number 7 (SS7) traffic sent to/from a circuit switched (CS) network 111 to be transmitted over an internet protocol (IP) network.

In accordance with the principles of the present invention, messages transmitted over an SGs interface 113a, 113b, 113c between an SGs application part (AP) gateway 101a, 101b and a mobile management entity (MME) 103a, 103b, 103c on a long term evolution (LTE) network 105 are transmitted via an SGs application part (AP) protocol over stream control transmission protocol (SCTP). Messages transmitted between an SGs application part (SGsAP) gateway 101a, 101b and a short message service center (SMSC) 107a, 107b, 107c/home location register (HLR) 109a, 109b, 109c on a circuit-switched (CS) network 111 are transmitted via a GSM MAP/CDMA IS-41 protocol over SIGTRAN M3UA/SCTP. The inventive SGs application part (SGsAP) gateway 113a, 113b, 113c converts SGsAP/SCTP signals received thereon to GSM MAP/CDMA IS-41 messages, and vice versa, when routing traffic between the long term evolution (LTE) 105 and circuit-switched (CS) 111 domains.

Figure 3:
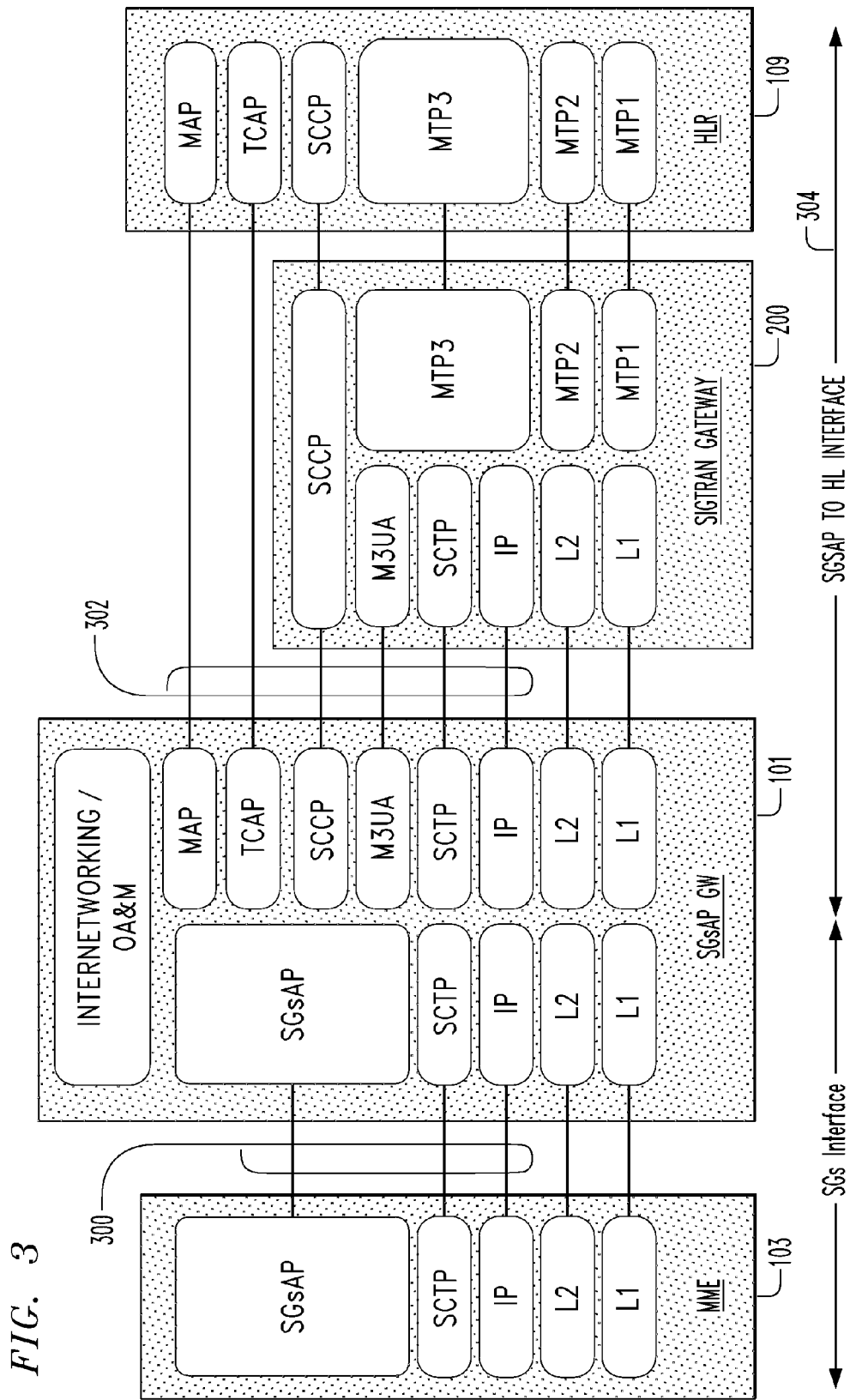
FIG. 3 depicts an exemplary protocol stack for an interface interconnecting an SGsAP gateway and a home location register (HLR) on a circuit-switched (CS) network, in accordance with the principles of the present invention.

FIG. 3 depicts an exemplary protocol stack for an interface interconnecting an SGsAP gateway and a home location register (HLR) on a circuit-switched (CS) network, in accordance with the principles of the present invention.

As portrayed in FIG. 3, the inventive SGs application part (AP) gateway 101 converts SGsAP/SCTP over internet protocol (IP) messages 300, transmitted from a mobile management entity (MME) 103 on a long term evolution network (i.e. evolved packet core (EPC) network) 105 to a home location register (HLR) 109 on a circuit-switched (CS) network 111, to GSM MAP/CDMA IS-41 over SIGTRAN M3UA/SCTP messages 302, before forwarding on to the circuit-switched (CS) network 111. Likewise, the inventive SGs application part (AP) gateway 101 converts GSM MAP/CDMA IS-41 over SIGTRAN M3UA/SCTP messages 302, transmitted from a home location register (HLR) 109 on a circuit-switched (CS) network 111 to a mobile management entity (MME) 103 on a long term evolution (LTE) network 105, to SCTP over SGsAP messages 300, before forwarding over the SGs interface 113 to the long term evolution (LTE) network 105.

Figure 4:
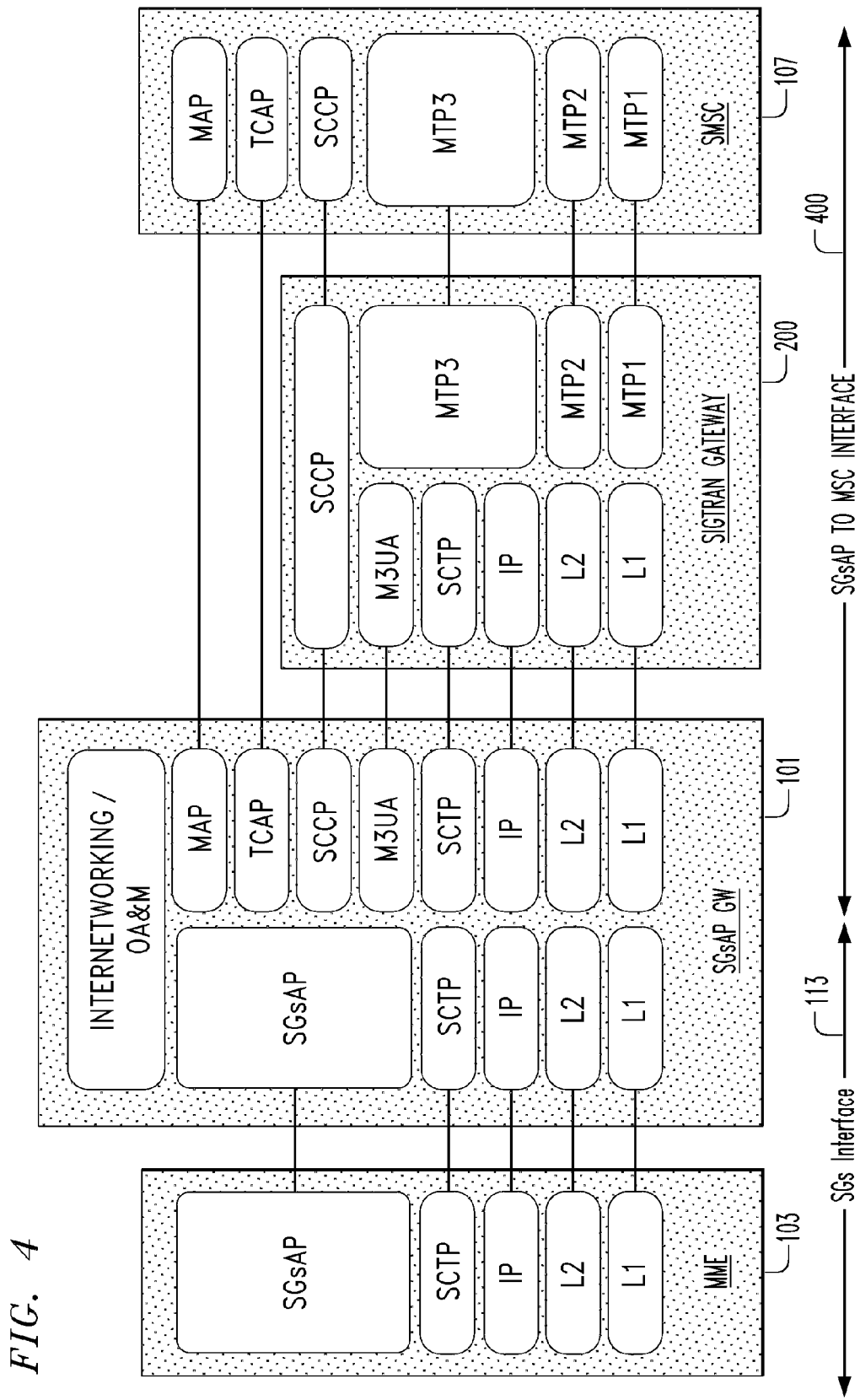
FIG. 4 depicts an exemplary protocol stack for an interface interconnecting an SGsAP gateway and a short message service center (SMSC) on a circuit-switched (CS) network, in accordance with the principles of the present invention.

FIG. 4 depicts an exemplary protocol stack for an interface interconnecting an SGsAP gateway and a short message service center (SMSC) on a circuit-switched (CS) network, in accordance with the principles of the present invention.

As shown in FIG. 4, a protocol stack for an SGs application part (AP) gateway 101 to short message service center (SMSC) interface 400 is the same as that of an SGs application part (AP) gateway to home location register (HLR) interface 304, as previously depicted in FIG. 3.

Table 1 depicts exemplary SGsAP to GSM MAP protocol mapping and vice versa, in accordance with the principles of the present invention.

| SGsAP command (3GPP 29.118) | GSM MAP Message (3GPP 9.02) |
|---|---|
| SGsAP-LOCATION-UPDATE-REQUEST | MAP_UPDATE_LOCATION |
| SGsAP-IMSI-DETACH-INDICATION | MAP_DETACH_IMSI |
| SGsAP-PAGING-REQUEST | MAP_PAGE |
| SGsAP-DOWNLINK-UNITDATA | MAP-MT-FORWARD-SHORT-MESSAGE |
| SGsAP-UPLINK-UNITDATA | MAP-MO-FORWARD-SHORT-MESSAGE |
| SGsAP-MM-INFORMATION-REQUEST | MAP-SEND-ROUTING-INFO-FOR-SM |

As depicted in Table 1, an SGs application part (AP) gateway 101 maps SGs application part (AP) protocol commands initiated on a mobile management entity (MME) 103 on a long term evolution (LTE) network 105 to GSM MAP messages for forwarding to a short message service center (SMSC) 107/home location register (HLR) 109 on a circuit-switched (CS) network 111. Similarly, the SGs application part (SGsAP) gateway 101 maps GSM MAP messages initiated on a short message service center (SMSC) 107/home location register (HLR) 109 on a circuit-switched (CS) network 111 to SGsAP commands for routing (via an SGs interface) to a mobile management entity (MME) 103 on long term evolution (LTE) network 105.

Figure 5:
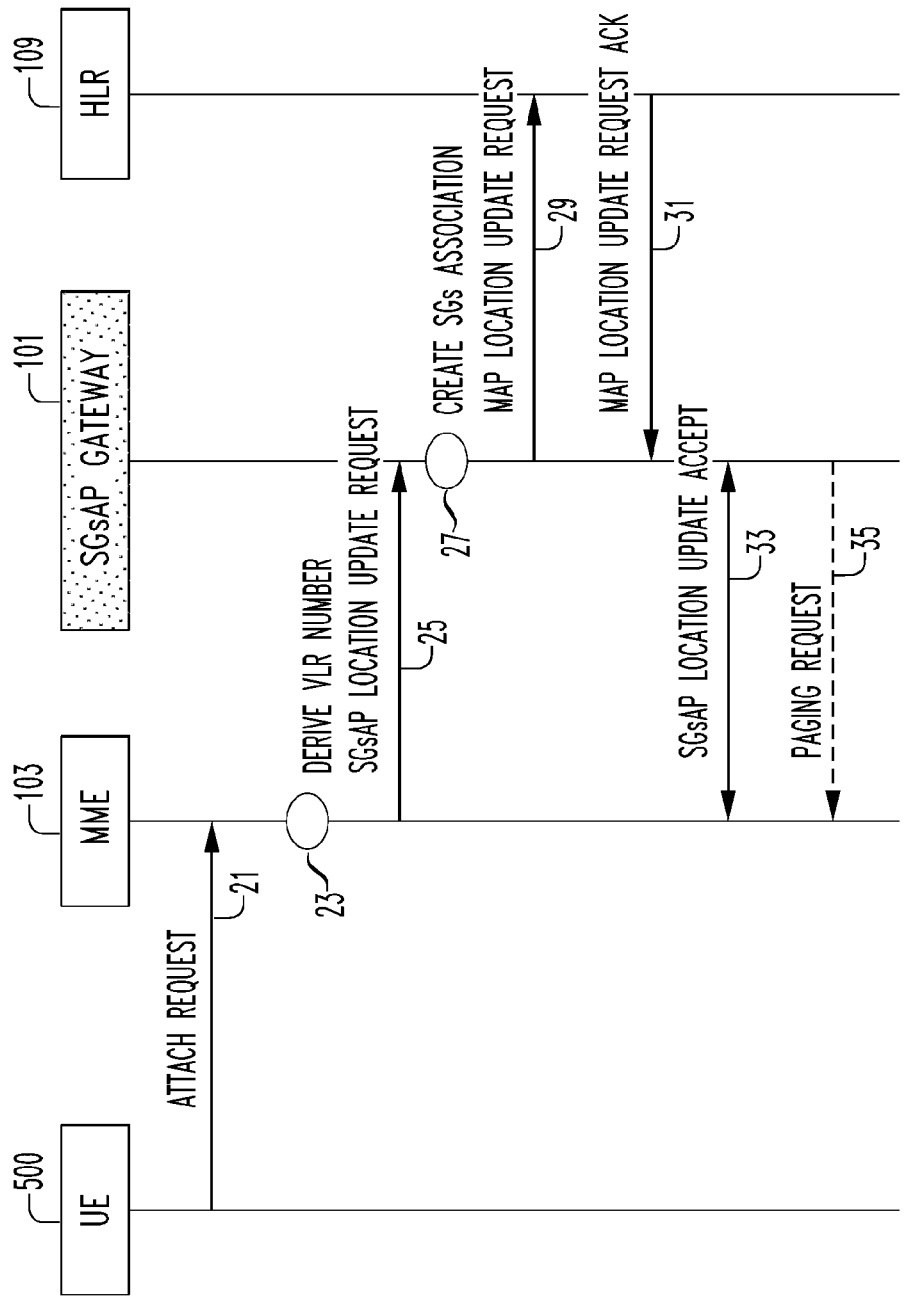
FIG. 5 depicts an exemplary attach call flow for SMS over SGs, in accordance with the principles of the present invention.

FIG. 5 depicts an exemplary attach call flow for SMS over SGs, in accordance with the principles of the present invention.

In particular, as depicted in step 21 of FIG. 5, a user equipment 500 sends an attach request to a mobile management entity (MME) 103 on an evolved packet core (EPC) network 105 to initiate an international mobile subscriber identity (IMSI) attach procedure. As shown in step 23, upon receiving an attach request, the mobile management entity (MME) 103 allocates a new location area identifier (LAI) to the requesting user equipment (UE) 500, and derives a visitor location register (VLR) number from the new location area identifier (LAI) and information received in the attach request. In step 25, the mobile management entity (MME) 103 forwards an SGsAP location update request to an SGs application part (AP) gateway 101. As shown in step 27, the SGs application part (SGsAP) gateway 101 receives the location update request and creates an SGs association to the mobile management entity (MME) 103. In step 29, the SGs application part (SGsAP) gateway 101 converts the SGsAP location update request received thereon to a MAP location update request and forwards the MAP location update request to a home location register (HLR) 109 on the circuit-switched (CS) network 111. In step 31, the home location register (HLR) 109 receives the MAP location update request and returns a MAP location update request acknowledgement to the SGs application part (SGsAP) gateway 101. As shown in step 33, the SGs application part (SGsAP) gateway 101 then forwards an SGsAP location update accept message to the mobile management entity (MME) 103 on the evolved packet core (EPC) network 105 to indicate successful attachment to the circuit-switched (CS) network 111. In step 35, the SGs application part (SGsAP) gateway 101 pages the mobile management entity (MME) 103.

Figure 6:
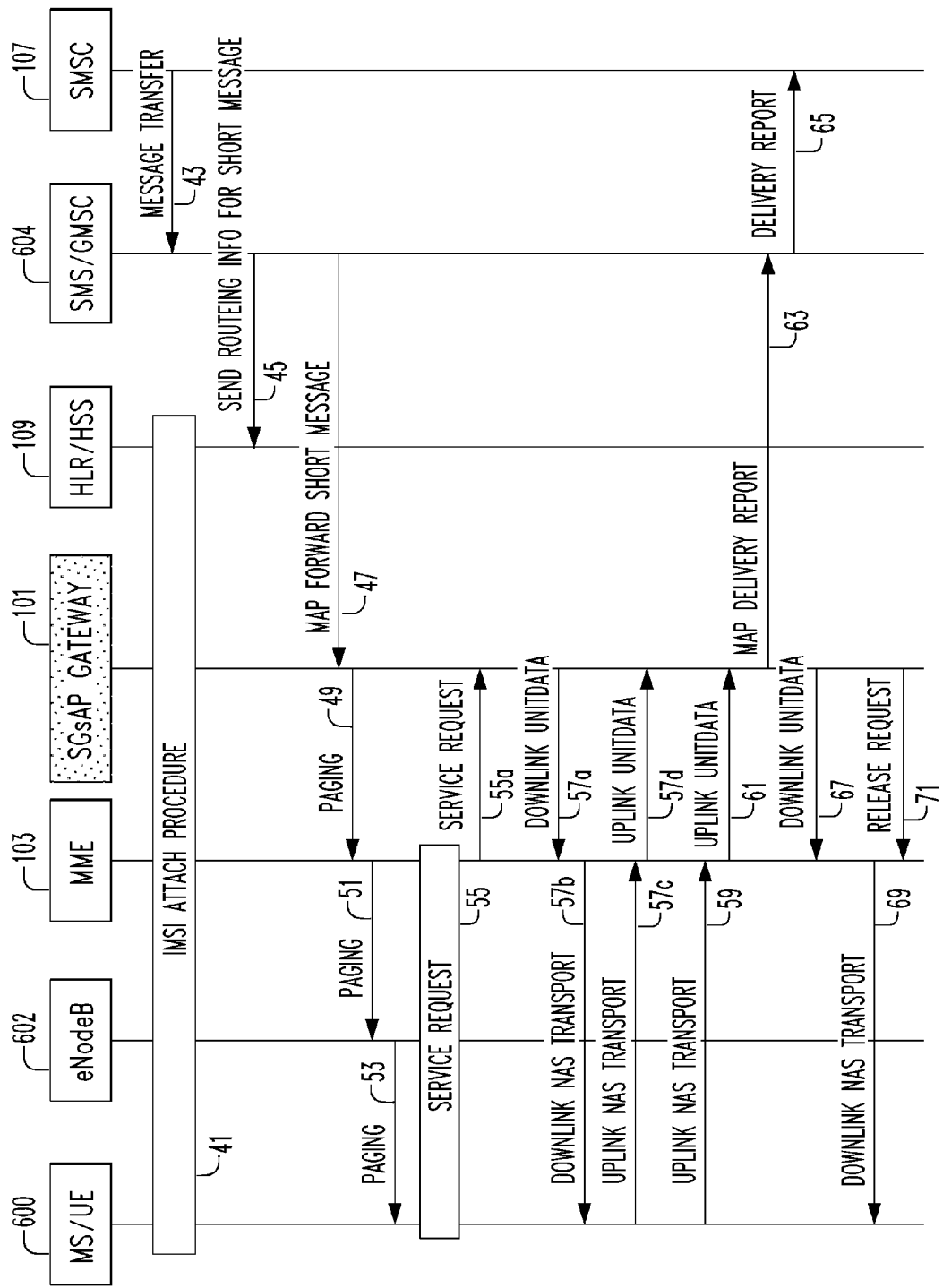
FIG. 6 depicts an exemplary mobile terminated call flow for SMS over SGs, in accordance with the principles of the present invention.

FIG. 6 depicts an exemplary mobile terminated call flow for SMS over SGs, in accordance with the principles of the present invention.

In particular, as depicted in step 41 of FIG. 6, a user equipment (UE) 600 sends an attach request to a mobile management entity (MME) 103 on an evolved packet core (EPC) network 105 to initiate an international mobile subscriber identity (IMSI) attach procedure. As shown in step 43, a short message service center (SMSC) 107 on a circuit-switched (CS) network 111 subsequently initiates transfer of a mobile terminating SMS message to the requesting user equipment (UE) 600. In step 45, a gateway mobile switching center (G-MSC) 604 on the circuit-switched (CS) network 111 requests routing information for the SMS message from a home location register (HLR) 109 on the circuit-switched (CS) network 111. As shown in step 47, the gateway mobile switching center (G-MSC) 604 subsequently receives routing information from the home location register (HLR) 109 and forwards a MAP forward short message, containing the mobile terminated SMS message, to an SGs application part (AP) gateway 101. In step 49, the SGs application part (AP) gateway 101 sends a paging message to a mobile management entity (MME) 103 on a long term evolution (LTE) network 105. The mobile management entity (MME) 103 then receives the paging message and sends a paging message to an eNodeB 602 on which the user equipment (UE) 600 is registered, as shown in step 51. As portrayed in step 53, the eNodeB 602 receives the page and pages the user equipment (UE) 600. In step 55, the user equipment (UE) 600 initiates a service request procedure. As portrayed in step 55*a*, a mobile management entity (MME) 103 serving the user equipment (UE) 600 subsequently receives the service request and forwards a service request message to the SGs application part (AP) gateway 101. In step 57*a*, the SGs application part (AP) gateway 101 forwards the mobile terminating SMS message in a downlink unitdata message to the mobile management entity (MME) 103 serving the user equipment (UE) 600. As shown in step 57*b*, the mobile management entity (MME) 103 then encloses the SMS message in a network-attached storage (NAS) message, and transmits the NAS message to the user equipment (UE) 600. As portrayed in step 57*c* and step 57*d*, the user equipment (UE) 600 then sends an acknowledgement message to the SGs application part (AP) gateway 101 to acknowledge receipt of the SMS message. In step 59 and step 61, the user equipment (UE) 600 additionally returns a delivery report to the SGs application part (AP) gateway 101. The SGs application part (AP) gateway 101 receives the delivery report and forwards the delivery report to the short message service center (SMSC) 107, as portrayed in step 63 and step 65. In steps 67 and 69, the SGs application part (AP) gateway 101 sends an acknowledgement message to the user equipment (UE) 600 to acknowledge receipt of the delivery report. In step 71, the SGs application part (AP) gateway 101 sends a release request to the mobile management entity (MME) 103 to indicate message transmission is complete.

In the SMS mobile terminating scenario, the SGs application part (AP) gateway 101 stores the address of the mobile management entity (MME) 103 serving the user equipment (UE) 600 during a registration phase. The SGs application part (AP) gateway 101 uses the registration information to route the SMS mobile terminated message to the serving mobile management entity (MME) 103.

Figure 7:
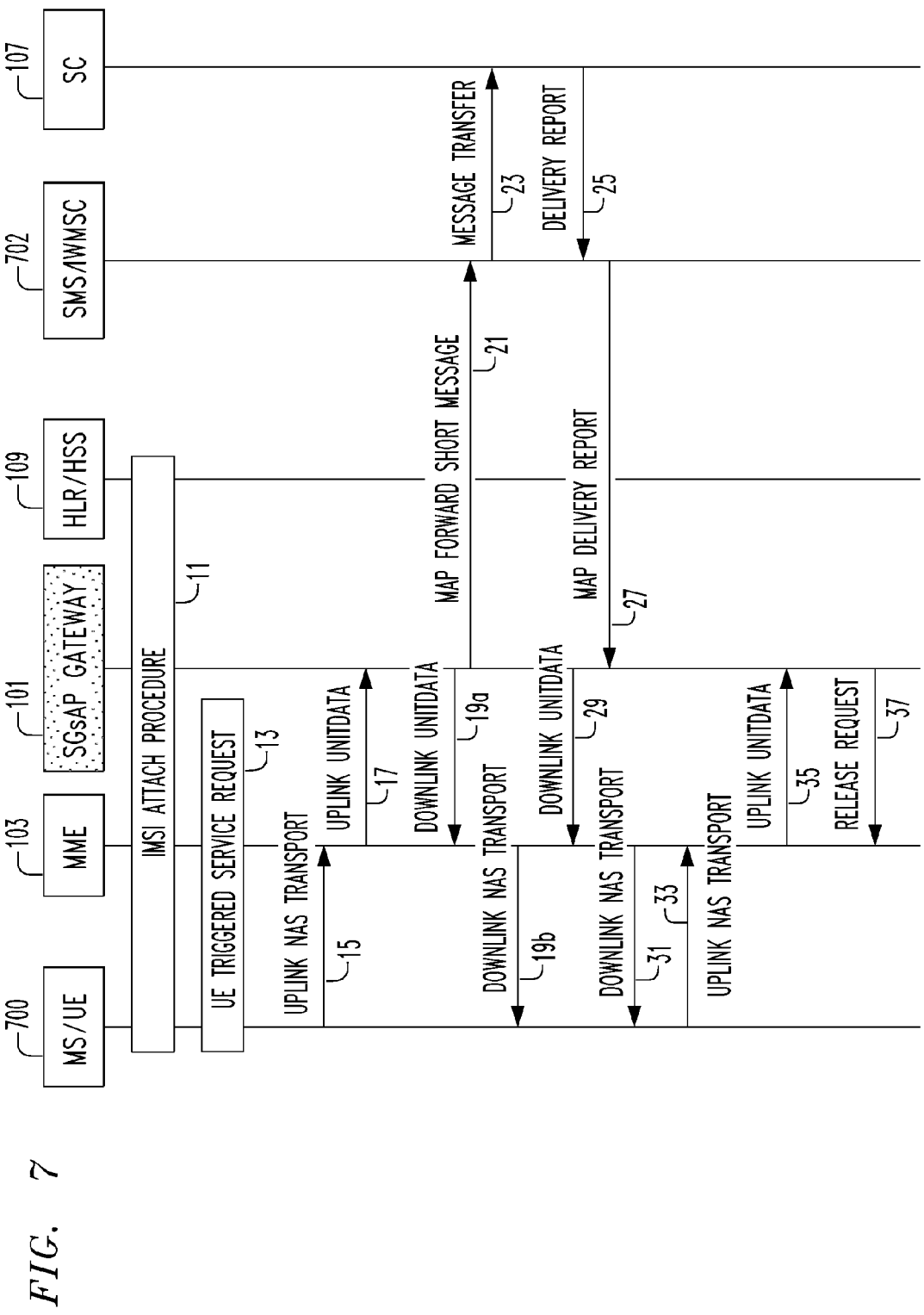
FIG. 7 depicts an exemplary mobile originated call flow for SMS over SGs, in accordance with the principles of the present invention.
Figure 8:
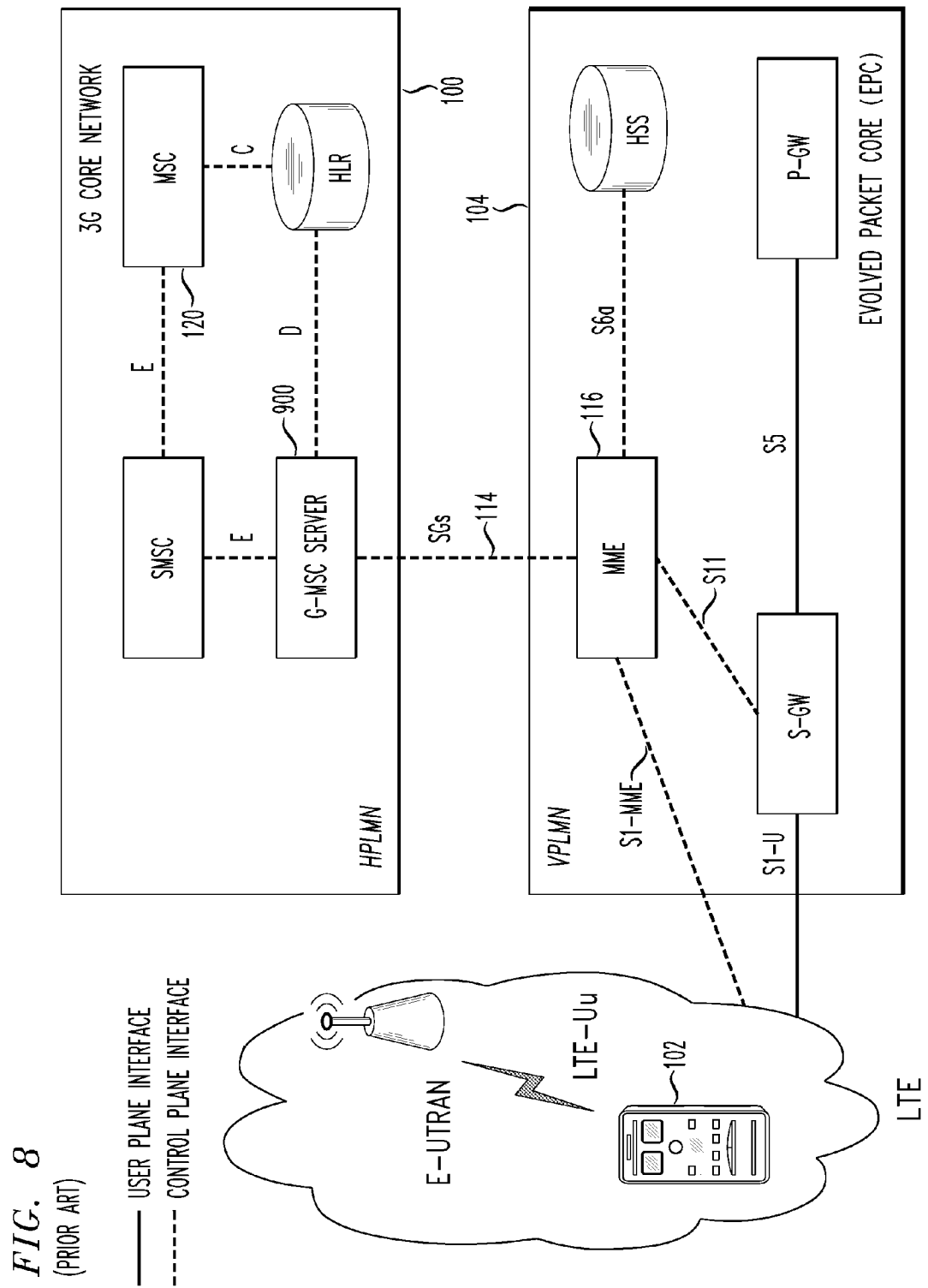
FIG. 8 depicts a conventional circuit-switched (CS) fallback architecture.
Figure 9:
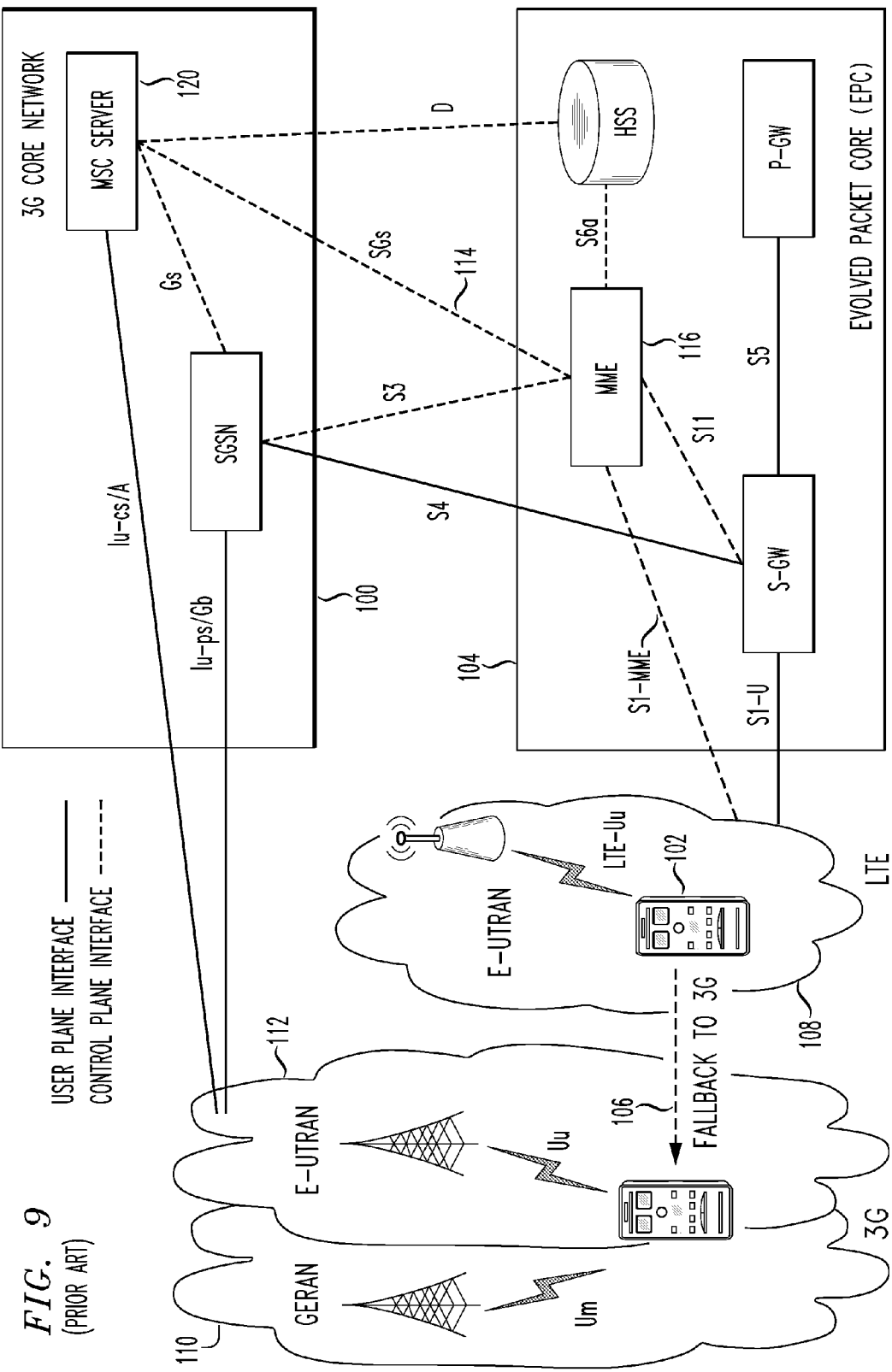
FIG. 9 depicts a conventional roaming architecture for providing short message service (SMS) over an SGs interface.
Figure 10:
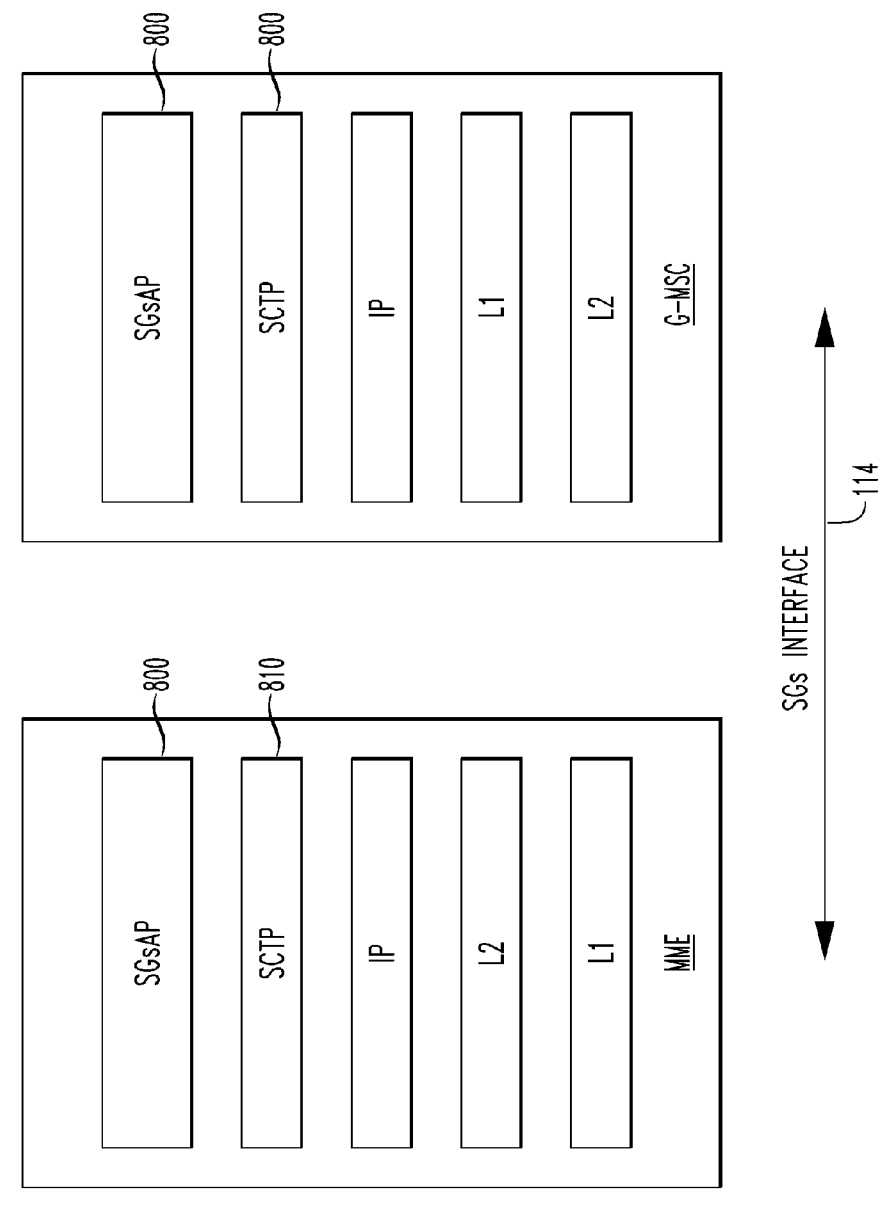
FIG. 10 depicts a conventional SGs interface protocol stack.

FIG. 7 depicts an exemplary mobile originated call flow for SMS over SGs, in accordance with the principles of the present invention.

In particular, as depicted in step 11 of FIG. 7, a user equipment (UE) 700 sends an attach request to a mobile management entity (MME) 103 on an evolved packet core (EPC) network 105 to initiate an international mobile subscriber identity (IMSI) attach procedure. In step 13, the user equipment (UE) 700 initiates a user equipment (UE) triggered service request procedure to trigger a mobile originating SMS. As shown in step 15, the user equipment (UE) 700 then builds the SMS message, encapsulates the SMS message in a network-attached storage (NAS) message, and forwards the message to a serving mobile management entity (MME) 103. As shown in step 17 of FIG. 7, the mobile management entity (MME) 103 serving the user equipment (UE) 700 receives the SMS message and forwards the message to an SGs application part (AP) gateway 101 via an uplink unitdata message. The SGs application part (AP) gateway then sends an acknowledgement message to the user equipment (UE) (steps 19*a* and 19*b*) to acknowledge message receipt, and then converts the SGsAP uplink unitdata message containing the mobile originated SMS message to a MAP forward short message, and routes the short message to a short message service center (SMSC) 107 on the circuit-switched (CS) network 111 (steps 21 and 23). As depicted in step 25 and step 27, the short message service center (SMSC) 107 receives the short message and subsequently returns a MAP delivery report to the SGs application part (AP) gateway 101. In step 29, the SGs application part (AP) gateway 101 converts the MAP delivery report received thereon to a downlink unitdata message and forwards the delivery report to the mobile management entity (MME) 103 serving the user equipment (UE) 700. As shown in step 31, the mobile management entity (MME) 103 encapsulates the delivery report received thereon in a downlink NAS message and forwards the delivery report to the user equipment (UE) 700. As portrayed in steps 33 and 35, the user equipment (UE) 700 then receives the delivery report and sends a delivery report acknowledgement to the SGs application part (AP) gateway 101. In step 37, the SGs application part (AP) gateway 101 sends a release request to the mobile management entity (MME) 103 to indicate that message transmission is complete.

In an SMS mobile originated call flow, the SGs application part (AP) gateway 101 maintains identities and addresses of roaming partners in a persistent database. Mobile country codes (MCC) and mobile network codes (MNC) are typically used to identify public land mobile networks (PLMN). The SGs application part (AP) gateway 101 uses an address derived from an international mobile subscriber identity (IMSI) (mobile country code (MCC) and mobile network code (MNC) values) obtained for an originating roaming user equipment (UE) 700 to route messages to a correct home public land mobile network (HPLMN).

From a long term evolution (LTE) domain 105 standpoint, the inventive SGs application part (AP) gateway 101 provides functionalities of a mobile switching center (MSC) server (MSC/VLR) 115 on a circuit-switched (CS) network 111 (as defined in 3GPP 29.118 and 3GPP 23.272). Mobile switching center (MSC) 115 functionalities performed by the SGs application part (AP) gateway 101 include: establishing, maintaining, managing, and gracefully terminating SMS sessions between user equipment (UE) and the SGs application part (AP) gateway 101 via a mobile management entity (MME) 103. Other functionalities performed on the SGs application part (AP) gateway 101 include: managing routing tables, registrations, and associations, and selecting home public land mobile networks (HPLMN) for routing.

From a 3G core network 111 standpoint, the inventive SGs application part (AP) gateway 101 provides functionalities of a gateway mobile switching center (G-MSC) 900 or a serving mobile switching center (S-MSC) on the 3G core network 111 (as defined in 3GPP 23.040 and 3GPP 29.02).

In accordance with the principles of the present invention, persistent data is preferably stored in a persistent database and managed by an operations, administration, and maintenance (OAM) interface. Persistent data preferably includes: roaming partners public land mobile networks (PLMN), service subscription information for each public land mobile network (PLMN), and a home location register (HLR) 109 address and a short message service center (SMSC) 107 address (based on mobile country code (MCC) and mobile network code (MNC) values) for each public land mobile network (PLMN).

Transient data (i.e. data created within a call session on a per-roaming subscriber basis) can optionally be stored in a transient database (for redundancy purposes) when requirements specify that a call session shall be maintained after a node failure. Transient data stored for a given call session preferably includes: an address of a mobile management entity (MME) 103 serving a roaming user equipment (UE) (address is stored upon location update), features supported on a roaming user equipment (UE), and alternate identification numbers (e.g. TIMSI) for a roaming user equipment (UE). Transient data stored for a call session is deleted when the user equipment (UE) involved in that call session leaves the network (e.g., via a detach mechanism). Call data records are maintained.

In accordance with the principles of the present invention, the SGsAP gateway design philosophy is based on task queues and worker threads, wherein each software component is dispatched on multiple threads. Fast message queues are used to enable inter-component communication. Message queues are monitored to manage resources and to prevent congestions.

The inventive SGs application part (AP) gateway 101 provides flexibility in the areas of deployment and vendor integration. The SGs application part (AP) gateway 101 can be deployed as a stand-alone system or as an n-tier model in a hosted or vendor environment.

The architecture of the proposed SGs application part (AP) gateway 101 is designed to take full advantage of a conventional hardware platform. The inventive architecture additionally promotes scalability.

In accordance with the principles of the present invention, the inventive SGs application part (AP) gateway 101 can simultaneously support roaming global system for mobile communications (GSM) and code division multiple access (CDMA) subscribers.

While the invention has been described with reference to the exemplary embodiments thereof, those skilled in the art will be able to make various modifications to the described embodiments of the invention without departing from the true spirit and scope of the invention.

What is claimed is:

1. A method to provide SMS over SGs via an SGs application part (AP) gateway, comprising:
    receiving a short message service (SMS) message over an SGs interface, from a mobile management entity (MME) in a long term evolution (LTE) network;
    converting said SMS message into a Global System for Mobile communication (GSM) MAP over signaling transport (SIGTRAN) MTP Level 3 User Adaptation layer (M3UA) message; and
    forwarding said GSM MAP protocol SMS message over a Signaling System No 7 (SS7) interface, to a short message service center (SMSC) in a circuit-switched (CS) network;
    wherein a mobile device serviced by said long term evolution (LTE) network is enabled to send said SMS message over said SS7 interface to said SMSC without triggering a circuit-switched (CS) fallback.

2. The method to provide SMS over SGs via an SGs application part (AP) gateway according to claim 1, further comprising:
    receiving a Mobile Application Part (MAP) delivery report from said SMSC over said SS7 interface;
    converting said MAP delivery report into a downlink unitdata message; and
    forwarding said downlink unitdata message to said mobile management entity (MME) in said long term evolution (LTE) network.

3. The method to provide SMS over SGs via an SGs application part (AP) gateway according to claim 1, wherein:
    said mobile device is a global system for mobile communication (GSM) mobile device.

4. The method to provide SMS over SGs via an SGs application part (AP) gateway according to claim 1, wherein:
    said mobile device is a code division multiple access (CDMA) mobile device.

5. The method to provide SMS over SGs via an SGs application part (AP) gateway according to claim 1, further comprising:
    managing a single stream control transmission protocol (SCTP) association with said SGs application part (AP) gateway by said physical mobile management entity (MME) in said long term evolution (LTE) network.

6. The method to provide SMS over SGs via an SGs application part (AP) gateway according to claim 1, further comprising:
    generating a call data record (CDR) for said short message service (SMS) message.

7. A method to provide SMS over SGs via an SGs application part (AP) gateway, comprising:
    receiving a short message service (SMS) message over a Signaling System No 7 (SS7) interface, from a Mobile Switching Center (MSC) server in a circuit-switched (CS) network;
    converting said SMS message into an SGs protocol SMS message; and
    forwarding said SGs protocol SMS message over an SGs interface, to a mobile management entity (MME) in a long term evolution (LTE) network;
    wherein a mobile device serviced by said long term evolution (LTE) network is enabled to receive a circuit-switched (CS) short message service (SMS) message without triggering a circuit-switched (CS) fallback.

8. The method to provide SMS over SGs via an SGs application part (AP) gateway according to claim 7, wherein:
    said mobile device is a global system for mobile communication (GSM) mobile device.

9. The method to provide SMS over SGs via an SGs application part (AP) gateway according to claim 7, wherein:
    said mobile device is a code division multiple access (CDMA) mobile device.

10. The method to provide SMS over SGs via an SGs application part (AP) gateway according to claim 7, further comprising:
    managing a single stream control transmission protocol (SCTP) association with said SGs application part (AP) gateway by said physical mobile management entity (MME) in said long term evolution (LTE) network.

11. The method to provide SMS over SGs via an SGs application part (AP) gateway according to claim 7, further comprising:
    generating a call data record (CDR) for said short message service (SMS) message.

* * * * *